United States Patent [19]

Fukushima et al.

[11] Patent Number: 5,639,552
[45] Date of Patent: Jun. 17, 1997

[54] STONG FLEXIBLE PRE-IMPREGNATION OF FIBER REINFORCED THERMOPLASTIC RESIN FREE FROM A VOID IN MATRIX

[75] Inventors: Toshiharu Fukushima; Kunimasa Muroi; Kunio Hiyama, all of Shizuoka, Japan

[73] Assignee: Yamaha Corporation, Japan

[21] Appl. No.: 608,708

[22] Filed: Feb. 29, 1996

Related U.S. Application Data

[62] Division of Ser. No. 240,908, May 11, 1994, Pat. No. 5,520,995.

[30] Foreign Application Priority Data

May 14, 1993 [JP] Japan .................................. 5-113468

[51] Int. Cl.$^6$ ................................................ B32B 5/16

[52] U.S. Cl. ........................... 428/408; 428/36.3; 428/58; 428/113; 428/188; 428/190; 428/192; 428/196; 428/198; 422/208; 422/186; 422/187

[58] Field of Search ........................... 428/36.3, 58, 113, 428/188, 190, 192, 196, 198, 225, 226, 227, 228, 229, 408; 57/210

Primary Examiner—Patrick Ryan
Assistant Examiner—Rich Weisberger
Attorney, Agent, or Firm—Ostrolenk, Faber, Gerb Soffen, LLP

[57] ABSTRACT

A pre-impregnation has a ribbon-shaped tow of reinforcing fibers and a ribbon of thermoplastic resin laminated on the ribbon-shaped tow and fixed thereto at intervals, and the thermoplastic resin is allowed to uniformly impregnate into the ribbon-shaped tow under heat application so that a void does not take place in the ribbon-shaped tow.

4 Claims, 6 Drawing Sheets

STRONG FLEXIBLE PRE-IMPREGNATION OF FIBER REINFORCED THERMOPLASTIC RESIN FREE FROM A VOID IN MATRIX

This is a division of application Ser. No. 08/240,908, filed May 11, 1994, now U.S. Pat. No. 5,520,995.

FIELD OF THE INVENTION

This invention relates to a pre-impregnation of fiber reinforced thermoplastic resin and, more particularly, to a strong flexible pre-impregnation of fiber reinforced thermoplastic resin.

DESCRIPTION OF THE RELATED ART

Tows of glass fibers or carbon fibers are impregnated with thermoplastic resin, and the thermoplastic serves as a matrix of the pre-impregnation. The pre-impregnation finds a wide variety of application such as, for example, delivery containers or sporting goods.

In general, a pre-impregnation of fiber reinforced thermoplastic resin is usually less flexible before application of heat, and is, accordingly, poor in workability. Various pre-impregnations flexible in room temperature have been proposed.

One of the approaches to the flexible pre-impregnations is to use a mixed yarn formed by a tow of thermoplastic resin and a tow of reinforcing fibers. FIG. 1 shows a typical example of a mixed yarn available for the flexible pre-impregnation. In the mixed yarn, a tow 1 of reinforcing fibers and a tow 2 of thermoplastic resin are simply twisted without opening, and heat fuses the tow 2 for forming the matrix of thermoplastic resin.

FIG. 2 shows another example of the mixed yarn available for the flexible pre-impregnation. The tow 1 of reinforcing fibers and the tow 2 of thermoplastic resin fibers is treated with opening, and are, then, twisted for forming the mixed yarn. When heat is applied, the tow 2 are fused, and form a matrix of thermoplastic resin.

FIG. 3 shows a modification of the mixed yarn illustrated in FIG. 2. In the mixed yarn shown in FIG. 3, the tow 1 of reinforcing fibers is mixed with powder 3 of thermoplastic resin. The powder 3 of thermoplastic resin is heat fusible, and forms a matrix of thermoplastic resin.

These mixed yarns are flexible in room temperature. The pre-impregnation is put in a mold, and heat fuses the tow 2 or the powder 3. The melted thermoplastic resin fills gaps between the reinforcing fibers of the tow 1, and the pre-impregnation is shaped into a product of fiber-reinforced thermoplastic resin.

However, the pre-impregnation formed from the mixed yarn shown in FIG. 1 encounters a problem in the volume much larger than the product of fiber-reinforced thermoplastic resin. The reason for the large volume is that the tows 1 and 2 are hardly twisted without gap, and the gap 4 between the tows 1 and 2 increases the volume of the pre-impregnation as shown in FIG. 4. Another problem encountered in the pre-impregnation is that the melted thermoplastic resin is hardly impregnated into the tow 1, and a void 6 tends to take place inside of the tow 1 as illustrated in FIG. 5.

The pre-impregnation formed from the mixed yard shown in FIG. 2 is not so large as the pre-impregnation shown in FIG. 1, and a void is not serious. However, the opening increases the production cost. The thermoplastic resin fibers are not uniformly mixed with the reinforcing fibers, and the thermoplastic resin fibers non-uniformly mixed results in non-uniformity of the matrix. Moreover, the reinforcing fibers are so thin that the mixing damages the reinforcing fibers.

The modification shown in FIG. 3 suffers from damaged reinforcing fibers, and the product encounters non-uniformity of the matrix due to dispersion of the power in the reinforcing fibers.

SUMMARY OF THE INVENTION

It is therefore an important object of the present invention to provide a pre-impregnation of fiber reinforced thermoplastic resin which is free from the problems inherent in the prior art pre-impregnations.

To accomplish the object, the present invention proposes to laminate a ribbon-shaped tow of reinforcing fibers on a ribbon of thermoplastic resin.

In accordance with the present invention, there is provided a pre-impregnation comprising: a) a tow of reinforcing fibers shaped into a ribbon; and b) a ribbon of thermoplastic resin overlapped with the tow so as to be fixed thereto at intervals.

The tow may be sandwiched between ribbons of thermoplastic resin, and the laminations may be woven.

BRIEF DESCRIPTION OF THE DRAWINGS

The features and advantages of the pre-impregnation according to the present invention will be more clearly understood from the following description taken in conjunction with the accompanying drawings in which.

DESCRIPTION OF THE PREFERRED EMBODIMENTS

First Embodiment

Figure 1:
FIG. 1 is a schematic perspective view showing the first prior art mixed yarn available for the pre-impregnation.
Figure 2:
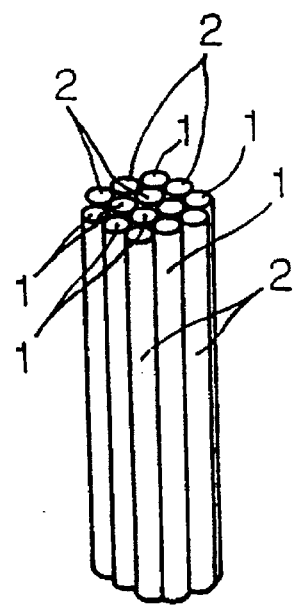
FIG. 2 is a schematic perspective view showing the second prior art mixed yarn available for the pre-impregnation.
Figure 3:
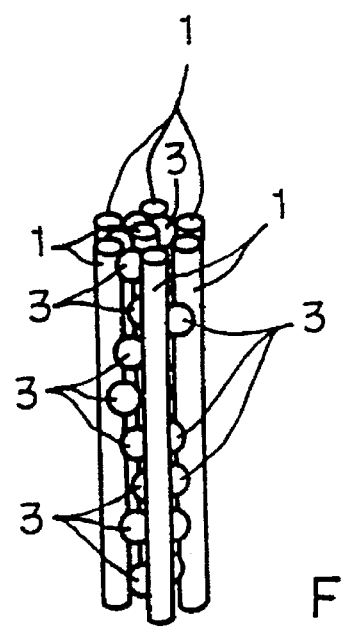
FIG. 3 is a schematic perspective view showing the third prior art mixed yarn available for the pre-impregnation.
Figure 4:
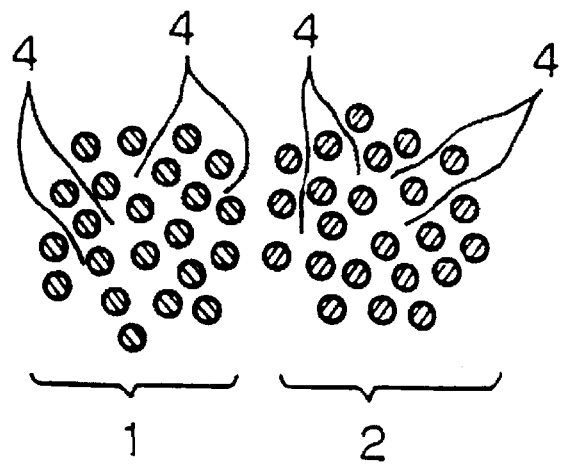
FIG. 4 is a cross sectional view showing, in an enlarged scale, the first prior art mixed yarn.
Figure 5:
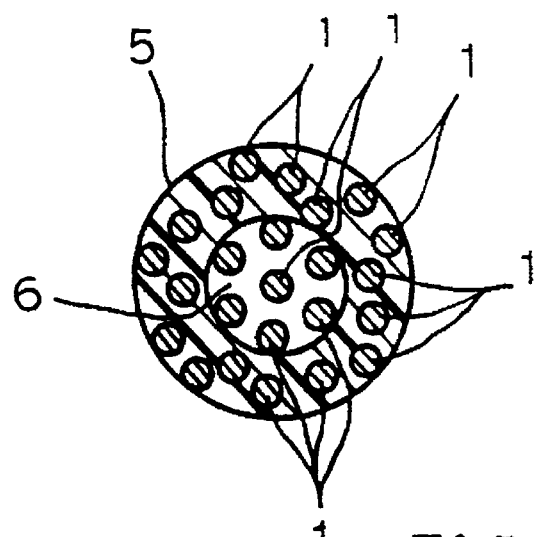
FIG. 5 is a cross sectional view showing the prior art tow of reinforcing fibers in the matrix.
Figure 6:
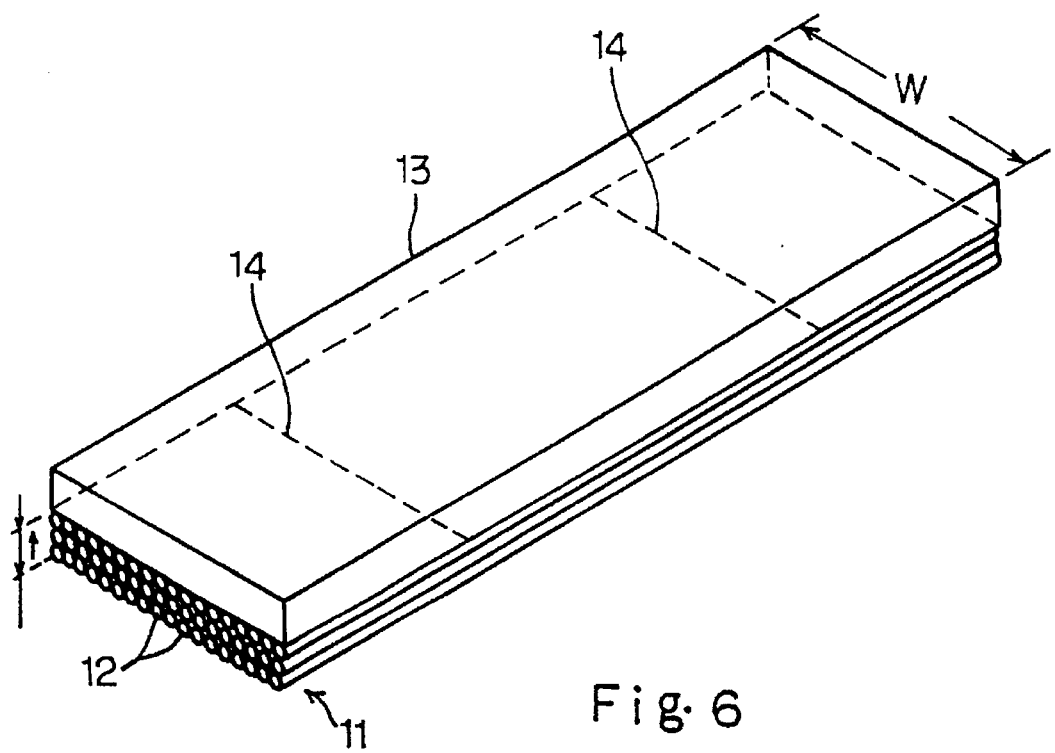
FIG. 6 is a perspective view showing a pre-impregnation of fiber reinforced thermoplastic resin according to the present invention.

Referring to FIG. 6 of the drawings, a pre-impregnation of fiber reinforced thermoplastic resin embodying the present invention largely comprises a ribbon-shaped tow 11 of reinforcing fibers 12 and a ribbon 13 of thermoplastic resin laminated on the tow 11. The reinforcing fibers 12 are glass fibers, carbon fibers or Kevlar fibers. The thermoplastic resin is selected from the group consisting of nylon, polyamide, polycarbonate, polypolyphenylene oxide, polyether-imide and liquid-crystal polymer, and the ribbon 13 is a film, a non-woven fabric, a cloth or a bundle of fibers. The film, the non-woven fabric, the cloth and the bundle of fibers gives the pre-impregnation flexibility, and the flexible pre-impregnation enhances the workability in a shaping stage.

The ribbon-shaped tow 11 is formed from a round tow of reinforcing fibers through a rolling, and is equal to or less than 1 millimeter in thickness. If the thickness t exceeds 1 millimeter, melted thermoplastic resin is hardly impregnated into a central portion of the ribbon-shaped tow 11. The rolling operation on the round tow crushes gaps among the reinforcing fibers 12, and, accordingly, increases the density of the tow 11.

The ribbon 13 of thermoplastic resin has a width W as wide as the tow 11, and the thickness of the ribbon 13 is regulated with respect to the thickness t of the tow 11 in such a manner that the fiber content Vf of the pre-impregnation falls within a predetermined range.

The ribbon 13 is registered with the tow 11, and, accordingly, the side edges of the tow 11 are aligned with the side edges of the ribbon 13. The ribbon 13 is fixed to the tow 11 at intervals of 1 to 30 centimeters. The ribbon 13 may be adhered, fusion bonded or stitched to the tow 11 along lines 14. If the ribbon 13 is stitched, a thread of thermoplastic resin is available.

Figure 7:
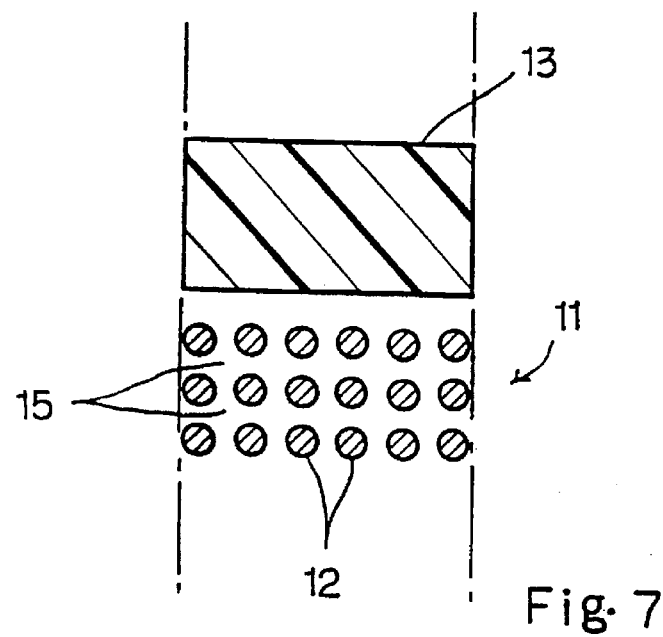
FIG. 7 is a cross sectional view showing a part of the pre-impregnation of fiber reinforced thermoplastic resin shown in FIG. 6.

FIG. 7 illustrates a part of the ribbon 13 laminated on a part of the tow 11. Although the rolling crushes gaps among the reinforcing fibers 12, the reinforcing fibers 12 are still microscopically spaced apart from each other, and, accordingly, gaps 15 take place among the reinforcing fibers 12. However, the ribbon 13 is so dense that no gap is formed therein. Therefore, the pro-impregnation implementing the present invention is smaller in volume than any of the prior art pre-impregnations. An opening is not required for the pre-impregnation according to the present invention, and the production cost is decreased. Moreover, the rolling operation does not damage the reinforcing fibers 12, and the pre-impregnation according to the present invention withstands large mechanical force.

Figure 8:
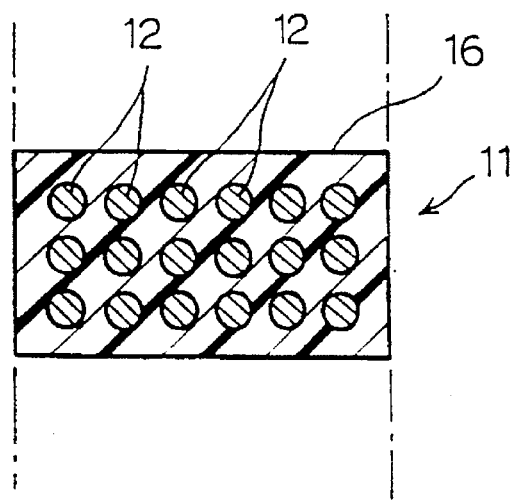
FIG. 8 is a cross sectional view showing the part of the pre-impregnation after application of heat thereto.

The pre-impregnation implementing the first embodiment is subjected to a hot pressing in a shaping work, and is heated over a softening point of the thermoplastic resin. The ribbon 13 is melted, and is impregnated into the tow 11. The ribbon 13 is so thin that the melted thermoplastic resin reaches the central zone of the tow 11 within short time period. When the tow 11 is cooled, the melted thermoplastic resin forms a matrix 16 as shown in FIG. 8, and a void never takes place. The matrix 16 is uniform in thickness, because the impregnating range is equal over the contact surface of the tow 13.

Second Embodiment

Figure 9:
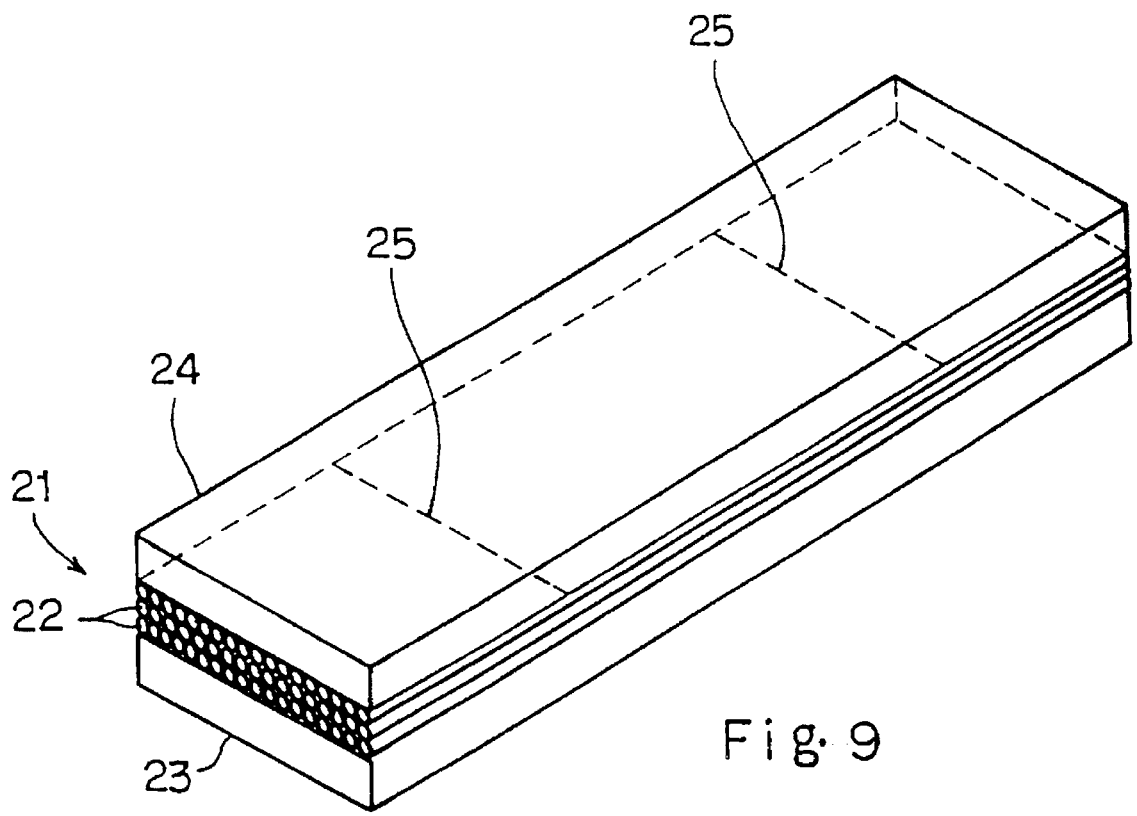
FIG. 9 is a cross sectional view showing another pre-impregnation of fiber reinforced thermoplastic resin according to the present invention.

Turning to FIG. 9 of the drawings, another pre-impregnation implementing the present invention comprises a tow 21 of reinforcing fibers 22 and lower and upper ribbons 23 and 24 of thermoplastic resin sandwiching the tow 21. The tow 21 and each of the upper and lower ribbons 23 and 24 are similar to the tow 11 and the ribbon 13, respectively, and the lower and upper ribbons 23 and 24 are fixed to the tow 21 at intervals. Broken lines 25 are indicative of the lines along which the ribbons 23 and 24 are adhered, fusion bonded or stitched with threads of thermoplastic resin to the tow 21. In a shaping stage, the thermoplastic resin forms a matrix under heat application.

The tow 21 is as wide as the lower and upper ribbons 23 and 24 so that the side edges of the tow are aligned with not only the side edges of the lower ribbon 23 but also the side edges of the upper ribbon 24.

The lower ribbon 23 and the upper ribbon 24 are thinner than the ribbon 13, and the total thickness of the lower and upper ribbons 23 and 24 is regulated in such a manner as to allow the reinforcing fibers in the matrix to fall within a predetermined range.

The pre-impregnation implementing the second embodiment achieves all the advantages of the first embodiment. Moreover, the melted thermoplastic is impregnated into the tow 21 from both upper and lower surfaces, and the impregnating range is shorter than that of the first embodiment. For this reason, the shaping work is completed within time, period shorter than that of the first embodiment, and the production cost is further decreased. The tow 21 is perfectly protected by the lower and upper ribbons 23 and 24, and, for this reason, the reinforcing fibers are less damaged rather than the first embodiment.

Third Embodiment

Figure 10:
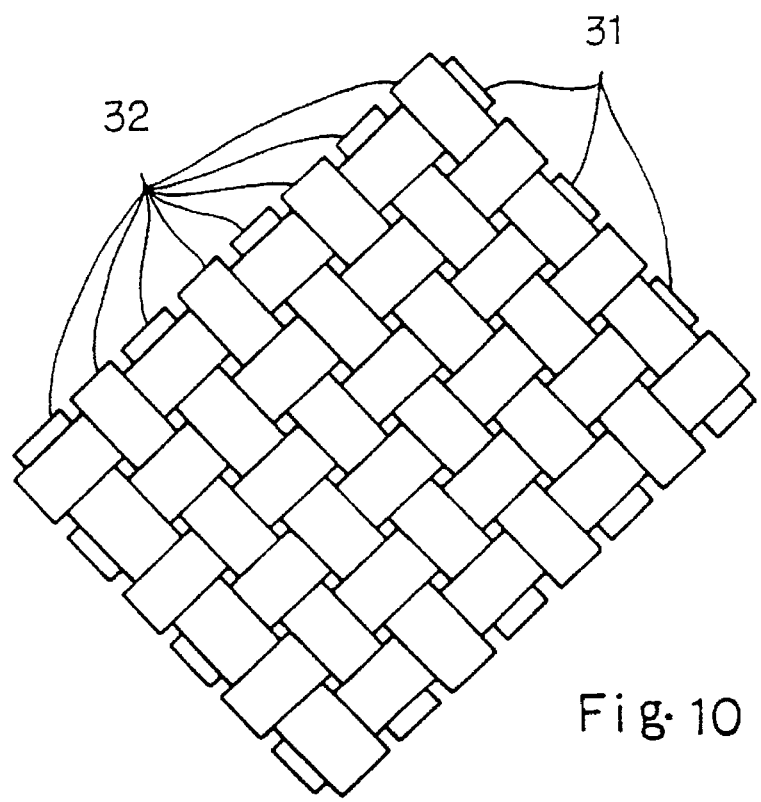
FIG. 10 is plan view showing yet another pre-impregnation according to the present invention formed from the ribbon-shaped pre-impregnation shown in FIG. 6 or 9.

Turning to FIG. 10 of the drawings, a pre-impregnation embodying the present invention comprises warps 31 and wefts 32 woven into a plain fabric. The ribbon-shaped pre-impregnation implementing the first or second embodiment is available for the warp 31 and the wefts 32. The plain fabric is flexible and available for producing a large product through a heat application in a mold without a void. Since the ribbon-shaped pre-impregnation implementing the first or second embodiment is used for the pre-impregnation implementing the third embodiment, all of the advantages of the first or second embodiment are achieved.

Fourth Embodiment

Figure 11:
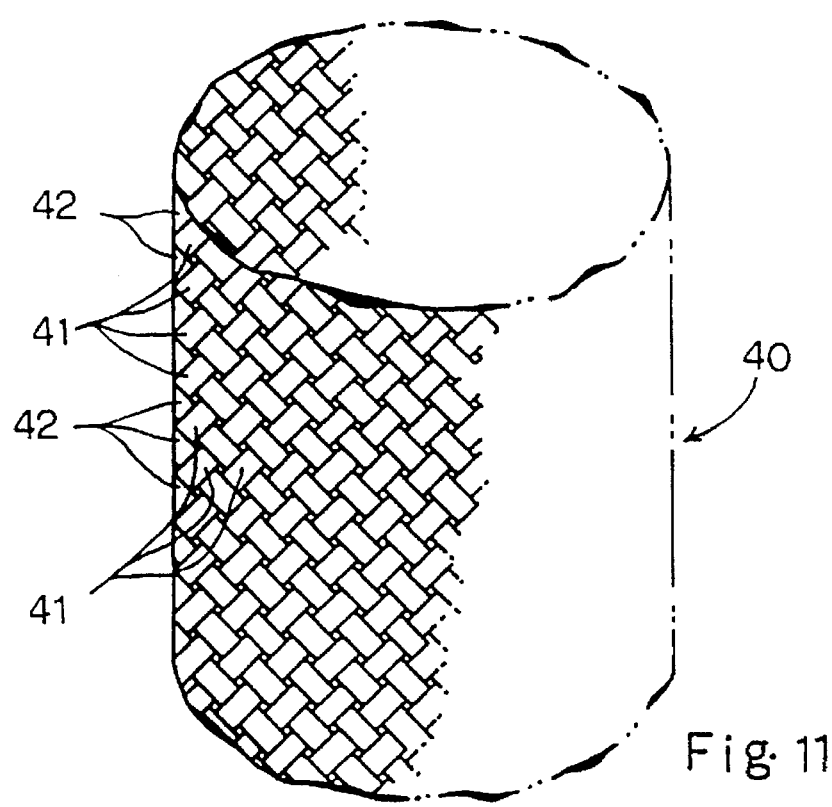
FIG. 11 is a perspective view showing still another pre-impregnation according to the present invention;.

Turning to FIG. 11 of the drawings, a pre-impregnation 40 embodying the present invention comprises warps 41 and wefts 42 woven in a double weaving manner. The ribbon-shaped pre-impregnation implementing the first or second embodiment is available for the warp 41 and the wefts 42. The pre-impregnation 40 thus double woven forms a tube, and is flexible in room temperature.

Figure 12:
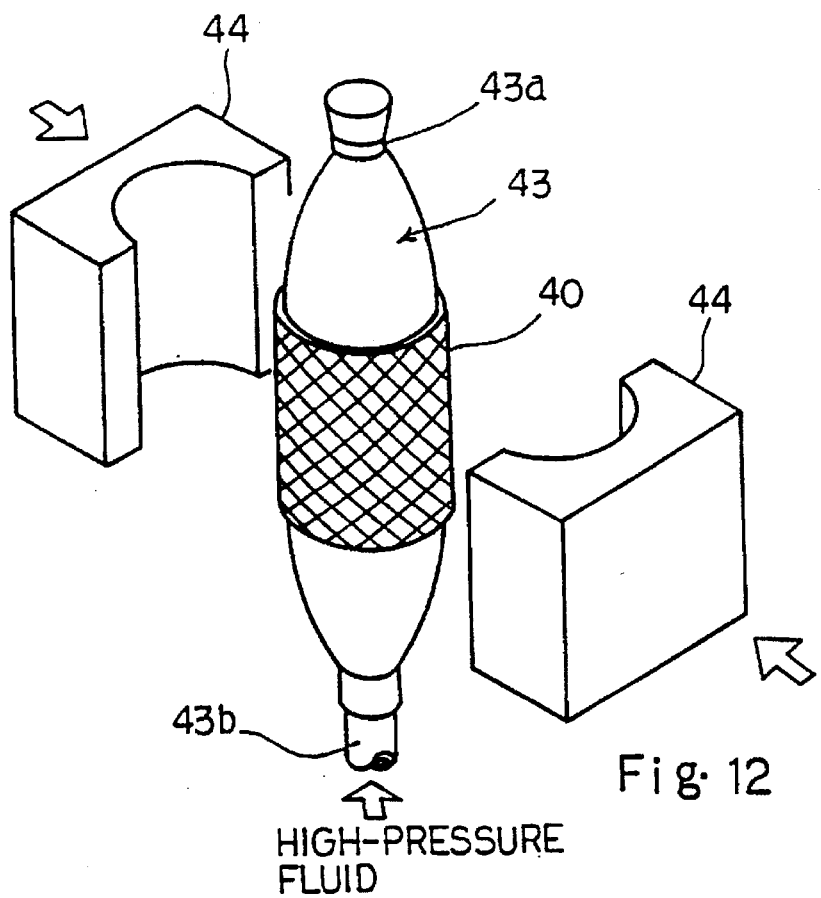
FIG. 12 is a perspective view showing a shaping work on the pre-impregnation shown in FIG. 11.

When shaping into a tubular product, an elastic tube 43 is inserted into an inner space of the tubular pre-impregnation 40, and is sealed at one end 43a thereof. High-pressure fluid is supplied from the other end 43b of the elastic tube 43, and expands it as shown in FIG. 12 of the drawings.

A die 44 is pressed onto the pre-impregnation 40, and the pre-impregnation 40 is heated over the melting point of the thermoplastic resin. Then, the ribbons 13 or 23/24 are melted, and the thermoplastic resin is impregnated into the reinforcing fibers 12 or 22 for forming a matrix.

Since the ribbon-shaped pre-impregnation is used for the tubular pre-impregnation, all of the advantages of the first or second embodiment are also achieved by the pre-impregnation implementing the fourth embodiment.

Fifth Embodiment

Figure 13:
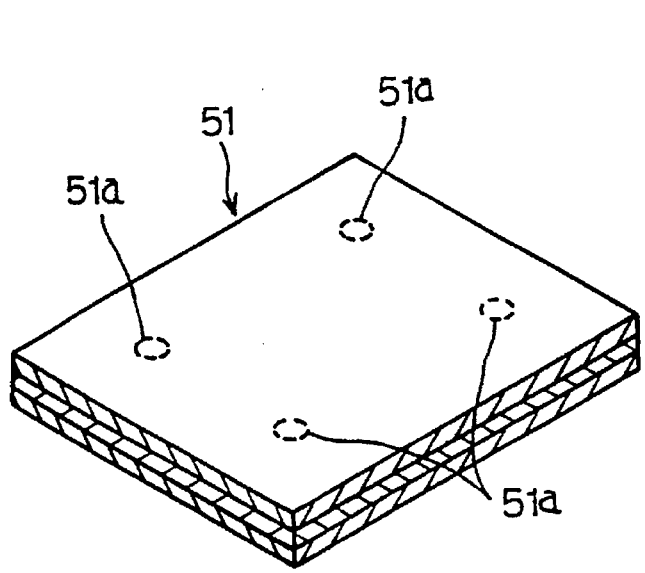
FIG. 13 is a perspective view showing a pre-impregnation shaped into a laminated structure according to the present invention.

Turning to FIG. 13 of the drawings, a pre-impregnation 51 embodying the present invention comprises a plurality sheets of the cloth shown in FIG. 10, and the plurality sheets of cloth are successively laminated, and the plurality sheets are bonded at spots 51a so as to prevent the sheets from a slippage therebetween. Each of the spots 51a is spaced apart from the adjacent spots 51a by 1 to 30 centimeters. Each sheet is thinner than the pre-impregnation shown in FIG. 10.

The tows of each sheet are oriented to a predetermined direction. However, the orientations between the sheets may be different from one another so as to equalize the tensile strength of the pre-impregnation 51 implementing the fifth embodiment. For example, the tows of the intermediate sheet are biased with respect to the tows of the lower and upper sheets.

Since the ribbon-shaped pre-impregnation shown in FIG. 6 or 9 is used for the pre-impregnation 51, all of the advantages of the first or second embodiment are also achieved by the pre-impregnation 51.

Sixth Embodiment

Figure 14:
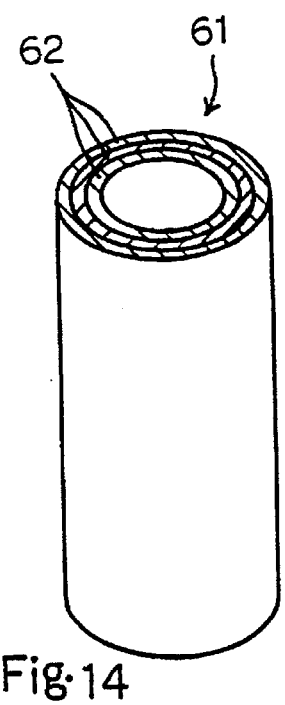
FIG. 14 is a perspective view showing a pre-impregnation shaped into a nested structure according to the present invention.

Turning to FIG. 14 of the drawings, a pre-impregnation 61 embodying the present invention comprises a plurality of the tubes 62 shown in FIG. 11 sequentially nested. The diameters of the tubes are arranged in such a manner as to be snugly received into the inner spaces of the larger tubes, and the tubes may be spot bonded to one another. Each tube 62 is thinner than the tubular pre-impregnation shown in FIG. 11.

The pre-impregnation shown in FIG. 61 is formed through the process described in connection with the fourth embodiment. If the ribbons 13 or 23/24 are formed of nylon, the elastic tube 43 may be expanded by using the high-pressure fluid at 10 kg/cm$^2$, and the die 44 is heated at 270 degrees in centigrade for 30 minutes.

The pre-impregnation implementing the sixth embodiment also achieves all of the advantages of the first or second embodiment.

As will be appreciated from the foregoing description, the ribbon of thermoplastic resin is uniformly impregnated into a ribbon-shaped tow of reinforcing fibers, and the impregnated thermoplastic resin forms a matrix without a void.

Although particular embodiments of the present invention have been shown and described, it will be obvious to those skilled in the art that various changes and modifications may be made without departing from the spirit and scope of the present invention. For example, the ribbon-shaped pre-impregnation may be shaped into another configuration such as, for example, a column, a disk, a cone or a ball.

What is claimed is:

1. A pre-impregnation comprising:
    a) a tow of reinforcing fibers shaped into a ribbon;
    b) a first ribbon of thermoplastic resin overlapped with said tow so as to be fixed thereto at intervals; and
    c) a second ribbon of said thermoplastic resin laminated on the other surface of said tow opposite to the surface attached to said first ribbon, in which warps each implemented by said tow sandwiched between said first and second ribbons and wefts each implemented by said tow sandwiched between said first and second ribbons are woven into a plain fabric.

2. A pre-impregnation comprising:
    a) a tow of reinforcing fibers shaped into a ribbon;
    b) a first ribbon of thermoplastic resin overlapped with said tow so as to be fixed thereto at intervals; and
    c) a second ribbon of said thermoplastic resin laminated on the other surface of said tow opposite to the surface attached to said first ribbon, in which warps each implemented by the lamination of said tow and said first and second ribbons and wefts each implemented by the lamination of said tow and said first and second ribbons are woven into a tubular fabric.

3. The pre-impregnation as set forth in claim 1, in which a plurality sheets of said pre-impregnations woven into said plain fabric are laminated and fixed to one another.

4. The pre-impregnation as set forth in claim 2, in which a plurality of said pre-impregnations woven into said tubular fabric are nested with one another.

* * * * *